(12) United States Patent
Aniszczyk et al.

(10) Patent No.: US 7,774,289 B2
(45) Date of Patent: Aug. 10, 2010

(54) CONCEPTUAL CONFIGURATION MODELING FOR APPLICATION PROGRAM INTEGRATION

(75) Inventors: Chris Aniszczyk, Austin, TX (US);
Borna Safabakhsh, Austin, TX (US);
Pierre F. Padovani, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 743 days.

(21) Appl. No.: 11/619,317

(22) Filed: Jan. 3, 2007

(65) Prior Publication Data

US 2008/0162107 A1 Jul. 3, 2008

(51) Int. Cl.
*G06F 17/00* (2006.01)
(52) U.S. Cl. .................. 706/45; 707/100; 717/100; 717/121; 713/1
(58) Field of Classification Search ............... 703/21; 706/12, 45; 713/1
See application file for complete search history.

(56) References Cited

U.S. PATENT DOCUMENTS

| | | | |
|---|---|---|---|
| 6,484,261 B1 | 11/2002 | Wiegel | |
| 6,662,235 B1 | 12/2003 | Callis et al. | |
| 6,681,382 B1 * | 1/2004 | Kakumani et al. | 717/122 |
| 6,718,380 B1 | 4/2004 | Mohaban et al. | |
| 7,272,815 B1 * | 9/2007 | Eldridge et al. | 717/101 |
| 2002/0062449 A1 | 5/2002 | Perna et al. | |
| 2002/0169957 A1 | 11/2002 | Hale et al. | |
| 2003/0167401 A1 | 9/2003 | Murren et al. | |
| 2004/0034767 A1 | 2/2004 | Robinson et al. | |
| 2004/0044987 A1 * | 3/2004 | Kompalli et al. | 717/100 |
| 2004/0083367 A1 | 4/2004 | Garg et al. | |
| 2005/0060393 A1 | 3/2005 | Parnafes et al. | |
| 2005/0144036 A1 | 6/2005 | Bell et al. | |
| 2005/0203819 A1 | 9/2005 | Rogers et al. | |
| 2005/0223392 A1 | 10/2005 | Cox et al. | |
| 2005/0289524 A1 | 12/2005 | McGinnes | |
| 2006/0005204 A1 * | 1/2006 | Siegel et al. | 719/313 |
| 2006/0242640 A1 * | 10/2006 | Pauly et al. | 717/174 |
| 2007/0073724 A1 * | 3/2007 | Walsh | 707/10 |

OTHER PUBLICATIONS

T. Mens, "A State-of-the-Art Survey on Software Merging," IEEE Transactions on Software Engineering, vol. 28, No. 5, pp. 449-462, May 2002.*
USPTO; examination correspondence in related U.S. Appl. No. 11/340,446, filed Jan. 26, 2006.

* cited by examiner

*Primary Examiner*—Donald Sparks
*Assistant Examiner*—David H Kim
(74) *Attorney, Agent, or Firm*—Robert H. Frantz; Jeffrey S. LaBaw

(57) ABSTRACT

First and second applications having disparate concrete configuration models are integrated into a unified abstract model wherein configuration elements and associated element values are used to control configurable functions of the first and second application programs, respectively, and wherein the second configuration element has a similar configuration function as the first configuration element; using a first equivalence definition reflecting a functional relationship between the first application configuration element and an abstract model configuration element having the similar configuration function, wherein the abstract model configuration is application-independent and platform-independent; using a second equivalence definition reflecting a functional relationship between the second application program configuration element and the abstract model configuration element; and producing and associating a second configuration element value with the second application configuration element wherein the second application program is automatically configured according to the second concrete application configuration model.

20 Claims, 14 Drawing Sheets

CONCEPTUAL CONFIGURATION MODELING FOR APPLICATION PROGRAM INTEGRATION

CROSS-REFERENCE TO RELATED APPLICATIONS (CLAIMING BENEFIT UNDER 35 U.S.C. 120)

None

FEDERALLY SPONSORED RESEARCH AND DEVELOPMENT STATEMENT

This invention was not developed in conjunction with any Federally sponsored contract.

MICROFICHE APPENDIX

Not applicable.

INCORPORATION BY REFERENCE

U.S. patent application Ser. No. 11/340,446, filed Jan. 26, 2006, by Chris Aniszczyk, et al., is hereby incorporation by reference in its entirety.

BACKGROUND OF THE INVENTION

1. Field of the Invention

The present invention relates generally to an improved data processing system, and in particular, to a method for reducing implementation time for product-level integration of related computer program products to yield end-to-end solutions.

2. Background of the Invention

As computer systems become increasingly complex, solutions rely more and more on multiple application programs being integrated to each other to achieve a complete functionality needed by a user or owner. Each of these application programs themselves can be quite complex.

The application programs are usually developed separately from each other such that terminology and user interface details such as where options are located within menus, what an option is called, etc., are different from each other. As such, "domain experts" for each application program to be integrated within an overall solution are needed in order to effectively implement the solution. Even products from the same vendor or supplier cannot be assumed to use similar user interface ("UI") concepts, configuration schemes and terminology because often times the products were originally developed for different market segments thereby driving differences, the products were acquired through corporate merger or product licensing, etc. Thus, it cannot be assumed that an expert on a certain brand and model of database would naturally be familiar and efficient with using another database or with using another non-database program from the same vendor (e.g. same brand).

This means that many programmer experts are needed to deploy a single multi-application solution. The ability to achieve efficient product-level integration of related but disparate application program products is a powerful enabler of marketing and technology to provide an end-to-end solution to client needs.

However, with the exception of the rare cases where related products are designed and developed in conjunction with the intent of integrated use cases, this integration can be a costly and daunting task. For mature products, integration at the product development level would often require a complete re-design and rewrite of at least one, if not both, of the products to be integrated.

Where products cannot integrate to be configured and executed as one, current solutions involve manually configuring the products separately, using product-specific user interfaces and terminology for each, so that the products may be configured to connect.

Drawbacks of such parallel but disjoint configuration of related products are three-fold: (i) a domain expert is required for each of the applications, with intimate knowledge of the terminology, data model, and user interface of that application; (ii) because each is configured separately, total resource cost of configuration rises, in relation to the number and complexity of each application; (iii) validation and integration test must be particularly thorough, to ensure a common goal for configuration in spite of different domain languages, terminology, and user interfaces.

SUMMARY OF THE INVENTION

Embodiments of the present invention integrate first and second applications having disparate concrete configuration models into a unified abstract model wherein configuration elements and associated element values are used to control configurable functions of the first and second application programs, respectively, and wherein the second configuration element has a similar configuration function as the first configuration element; by using a first equivalence definition reflecting a functional relationship between the first application configuration element and an abstract model configuration element having the similar configuration function, wherein the abstract model configuration is application-independent and platform-independent; using a second equivalence definition reflecting a functional relationship between the second application program configuration element and the abstract model configuration element; and producing and associating a second configuration element value with the second application configuration element wherein the second application program is automatically configured according to the second concrete application configuration model.

BRIEF DESCRIPTION OF THE DRAWINGS

The following detailed description when taken in conjunction with the figures presented herein provide a complete disclosure of the invention.

DETAILED DESCRIPTION OF THE INVENTION

Figure 1:
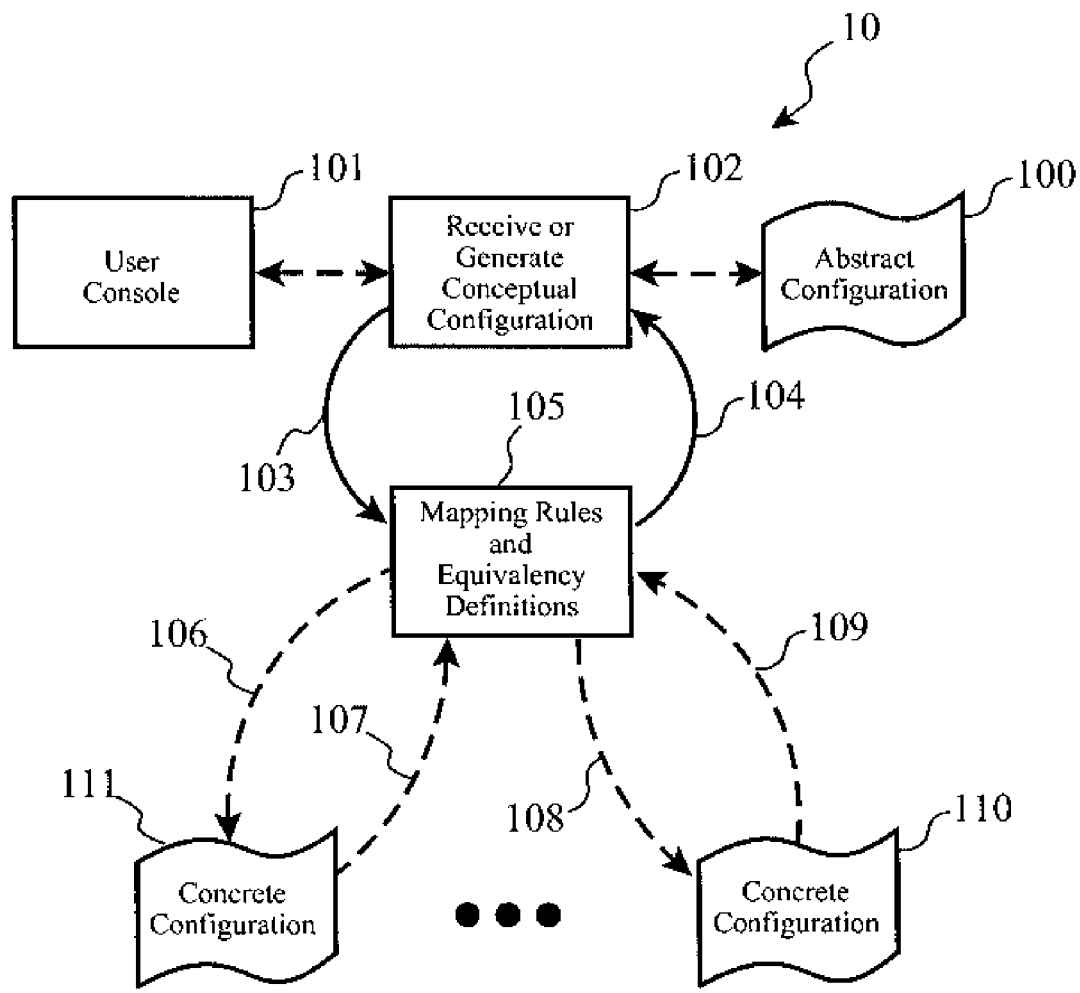
FIG. 1 depicts a logical process according to the present invention for mapping abstract configuration models to more concrete configuration models, or vice versa.

The inventors of the present invention have recognized a problem unaddressed in the art regarding integration of application programs into a computer-based solution wherein the application programs utilize disparate concrete configuration and user interface models, thereby traditionally requiring multiple domain experts for multiple application configurations. The present invention resolves and alleviates these requirements, allowing end-to-end integration of such application programs with considerably less administrator expertise level for each of the individual application programs within the solution.

System Overview

Processes, methods, and systems according to the present invention map configuration elements of related, but distinct, applications to a higher-level configuration model for the purpose of integrating the applications. With this higher-level configuration model, a deployment engineer may model the configuration of the larger system. Then, at the time of configuration, the more abstract data model is translated, through mapping rules and equivalence definitions, and each application is automatically configured, to the deepest extent expressible in original model, in its domain-specific language.

Complex cases are conceivable where mapping is difficult or the development of mapping rules is not feasible; however, in many cases, with related applications, such as those in the Tivoli™ Security Pillar, the similarity is much greater than the difference and automated translation schemes are plausible.

Using this invention, multiple applications may be configured "under the covers" of a single user interface and configuration model, to integrate as seamlessly as possible.

For the remainder of this disclosure, we will refer to configuration models as having a degree of being "concrete" or "abstract". A strictly concrete configuration model is a model in which the user interface, terminology, and configuration elements follow naming conventions, range definitions, option identifiers, etc., which are compatible with a machine implemented language, such as a particular application program, without further translation or interpretation. For example, a "concrete" configuration element for an enterprise security product to allow a user to change a password could be called "param_A". A deployment engineer unfamiliar with this application program and its domain could not determine from such a configuration element what it controls or what its allowed settings are simply from the configuration element name. If the application program utilized a text file to contain these configuration elements, for example, this configuration element may look something like:

param A=1;

where "1" is defined to allow the user to change his or her own password. Therefore, to correctly install this application and configuration element, one would need a high level of domain expertise with the application program, including all of the user interface models (e.g. where "things" are located in each menu, file, etc.) and all naming conventions for configuration elements.

In contrast, a "abstract" configuration model is one in which the configuration elements are not necessarily specific to any particular application program, are application-independent and/or platform-independent. A typical abstract configuration model also exists a high degree of user friendliness.

So, in an abstract configuration model, the previous example of a password change permission configuration element would be called "user_permitted_to_change_own_password", and the allowable options would be "yes" or "no". An example line in a configuration file for such an abstract system configuration may appear as:

user_permitted_to_change_own_password=yes;

As shown in this simple set of contrasting examples, abstract models require much less knowledge of the specifics of a particular application, and thus are preferable in performing integration of multiple application programs. However, generally speaking, independently developed application programs, even those provided by the same vendor, rarely use such abstract configuration models, but instead use much more concrete configuration models. In practice, each actual application program utilizes a higher or lower degree of concrete configuration.

Figure 5:
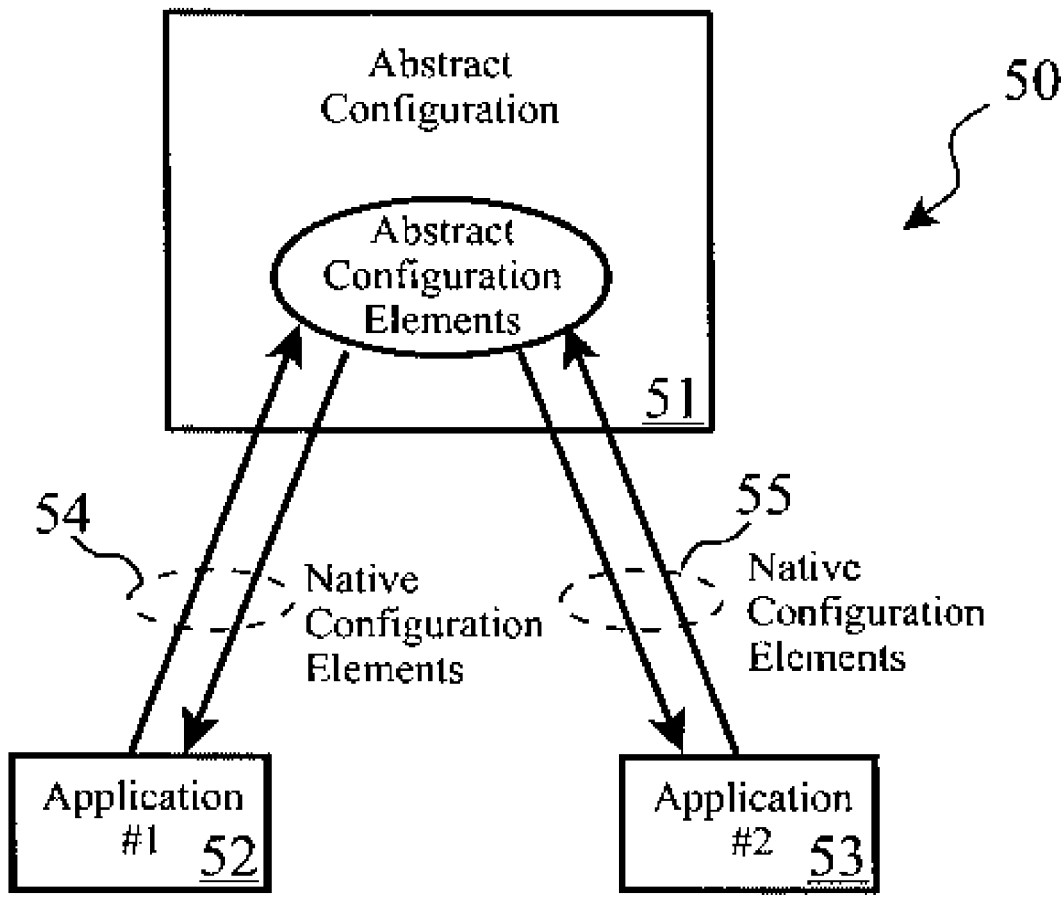
FIG. 5 shows an arrangement and relationship between two application-native, concrete configurations to an abstract configuration according to the present invention.

Turning to FIG. 5, a simplified diagram showing two application programs (52, 53) in a relationship (50) with an abstract configuration (51), between which specific configuration elements native to each application program (54, 55 respectively) are shared. In this arrangement, the application programs are assumed to implement configuration models which are more concrete than that of the abstract configuration, and it is further assumed that there is a degree of correlation between the configuration elements in meaning, functionality, interpretation, or impact between the application programs (e.g. they share many common needs for configuration input such as user name, user address, etc., but require input in different formats).

Hierarchical Conceptualized Configuration Models

Figure 6A:
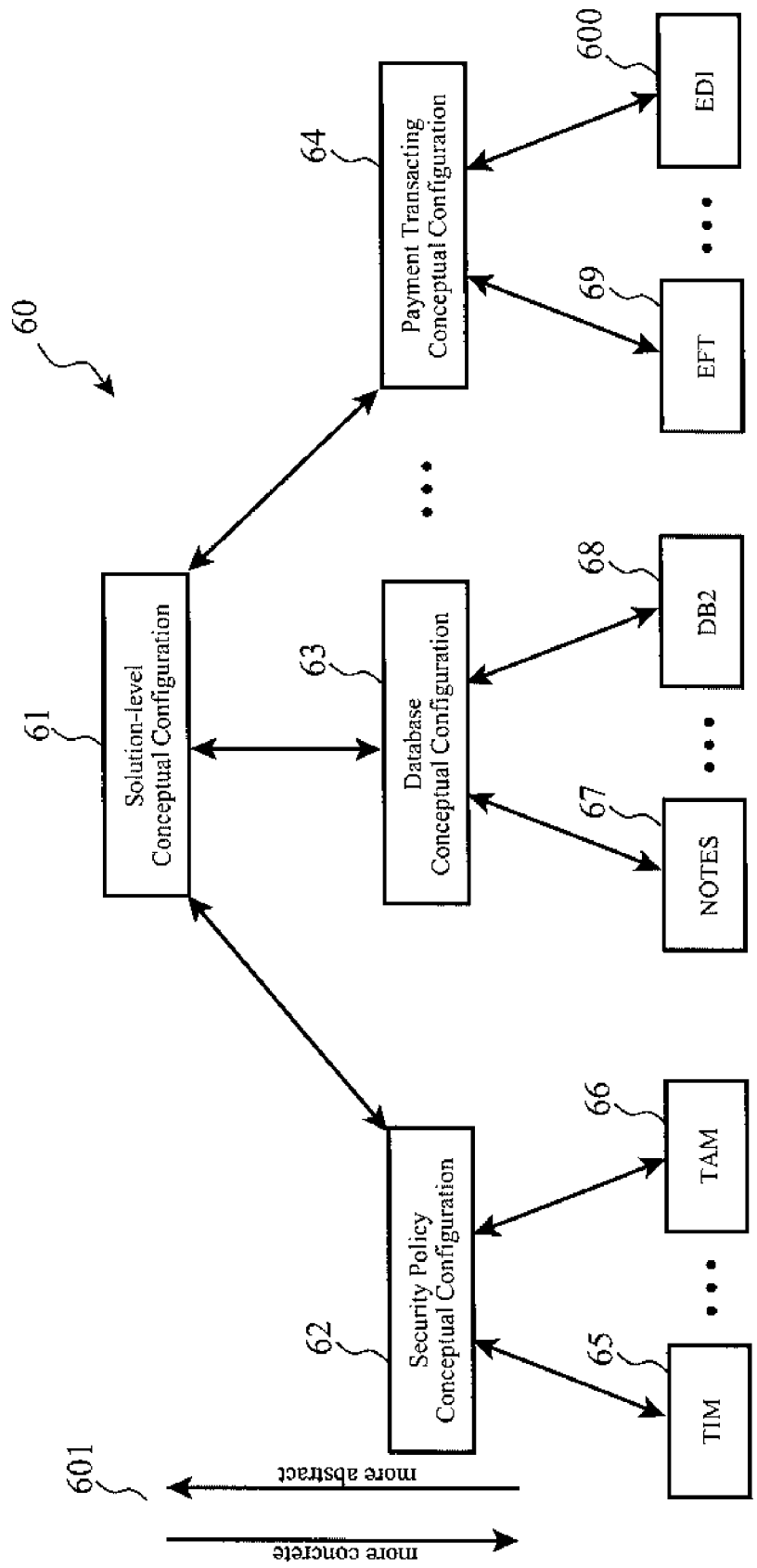
FIGS. 6a and 6b depict multi-layer hierarchical arrangements and relationships between multiple application-native, concrete configurations and one or more abstract configurations according to the present invention.

Turning to FIG. 6a, a more realistic hierarchical relationship (60) of configuration models is shown having multiple layers of models in which each model is more or less concrete (601). In this arrangement, application programs are shown as having the most concrete configuration models, while intermediate configuration models are more abstract in nature for a group of functionally-related application programs, and where a solution-level abstract configuration model provides and even higher level of conceptualized configuration for the entire solution across all types or domains of applications. In this example, security application (65, 66) are configured through a security policy abstract configuration (62). This is achievable because, although the concrete configuration models of the applications themselves use much different terminology or user interfaces, they apply to a common domain of functionality or work flow (e.g. enterprise security in this example), and thus much of the needed information to configure each application is similar (e.g. user names, user roles, user permissions).

Figure 6B:
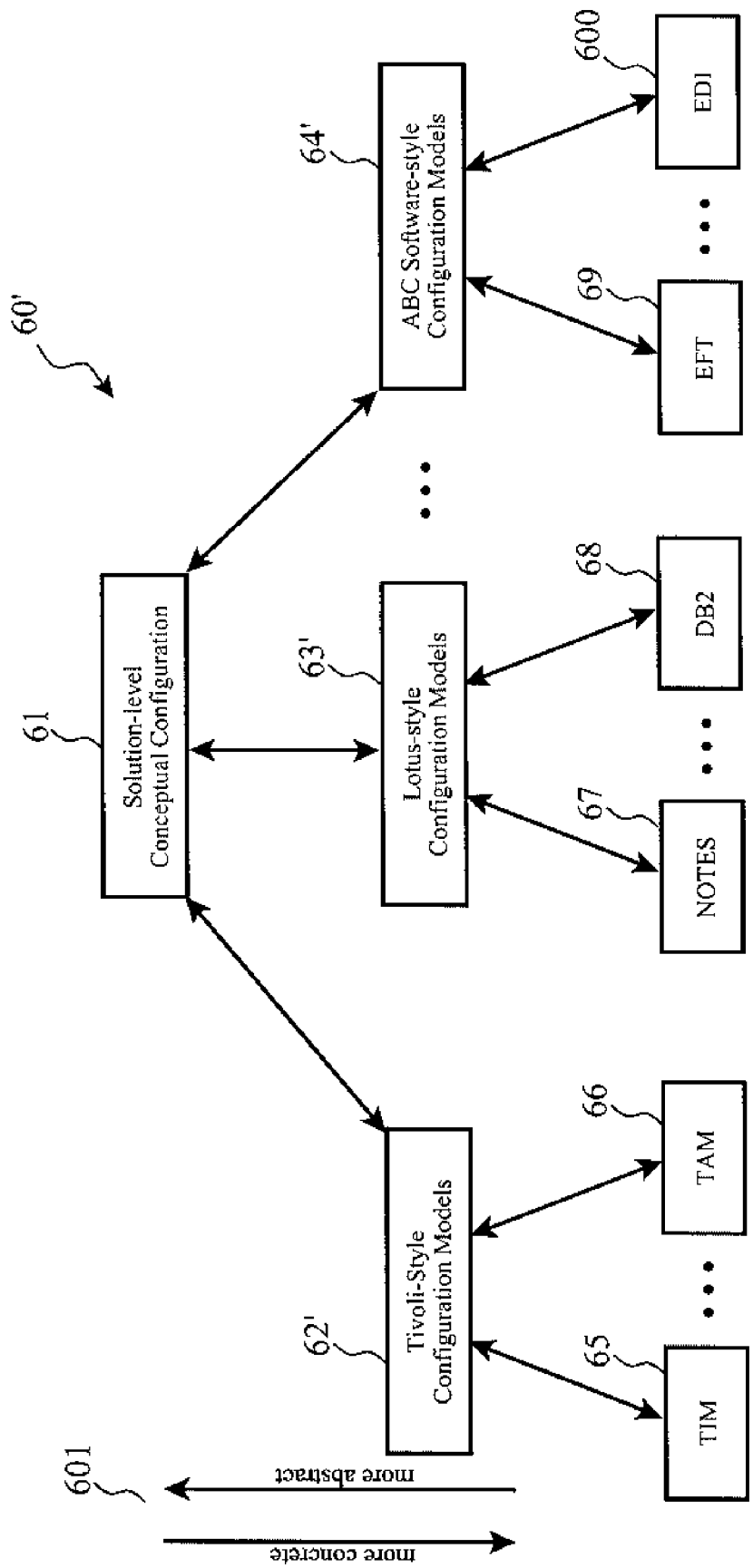

Further in this example, database application programs (67, 68) are configured through a database abstract configuration model (63). Similarly to the relationship between the security applications, these database applications have disparate concrete configuration models, but share much of the same needed information to complete a configuration. And, likewise, other types of applications can be joined through an abstract configuration model, such as one (64) which configures all payment transacting applications (69, 600). FIG. 6b provides an alternative organization (60') in which application programs are grouped by vendor or supplier due to their configuration model styles (62', 63', 64') being similar.

However, the intermediate level of abstract configuration model is still somewhat domain specific, such as vendor-style specific or application-function specific. The payment transacting abstract configuration model, for example, still requires some domain expertise in the field of electronic payment processing, even though specific knowledge of specific payment processing applications is not needed. So, in order to complete an end-to-end solution integration, several domain experts would be needed. For example, in FIG. 6a, a configuration parameter which controls a maximum customer last name value might be called "maxnam1length" for the EFT application (69), a similar configuration element for the Notes application (67) might be "first_name_length", and a similar configuration element for the DB2 field might be "name_first_string_length". In a first level of abstraction (63) for the database applications (67, 68), a relatively more abstract, equivalent element name for "first_name_length" and "name_first_string_length" could be "database-customer-first-name-field-length". In a second level (61) of abstraction for the solution-level configuration, the database somewhat abstract element "database-customer-first-name-field-length" and the concrete EFT field "maxnam1length" could be defined as a relatively more abstract field of "solution-allowable-customer-first-name-length".

To this end, the present invention provides for an extensible, multiple-layer configuration model hierarchy which allows successively higher layers of abstract configuration all the way to a solution-level abstract configuration (61). At this level, the deployment engineer must have expertise in the mission or overall objective of the solution, such as providing an online web store with integrated customer account management, but needs little if any expertise in the sub-domains (e.g. payment transacting, security policy, etc.), and even less expertise in application-specific configuration (e.g. DB2 configuration expertise or electronic funds transfer configuration). This is achieved by the unique combination of rule-based logic and equivalence definitions which can be applied at any level to make any two more relatively concrete configuration models configurable through a relatively abstract model. In this manner, the invention can be used at several layers, each layer providing for incrementally more abstract configuration above the previous layer.

Implementation Details

To further explain implementation and use of the invention, the remainder of this disclosure will use two security policy tools as examples of application programs which may be configured through an abstract configuration model even though each application program implements a concrete configuration model. It will be understood by those skilled in the art that these are merely examples of applications to which the invention may be applied, and that the invention may be used to conceptually configure a wide variety of other abstract models as well as a wide variety of other application programs.

IBM Tivoli Identity Manager ("TIM") and IBM Tivoli Access Manager ("TAM") are two security policy-related products that are not integrated at the time of the development, but often are deployed together within an end-to-end solution. Since both applications are concerned with the resource access control of users, the conceptual overlap is clear. However, the terminology and user interface differences between their concrete configuration models lead them to be configured separately, often with some confusion associated with integration at deployment.

Using this invention, an abstract configuration modeling layer is created in which the higher-level security configuration can be specified in a more conceptual manner without specificity of the actual configuration element names and options of the underlying TAM and TIM applications.

The individual product concrete configurations are then derived using configuration object mapping rules, and finally exported to the applications to automatically achieve a configuration.

Figure 7:
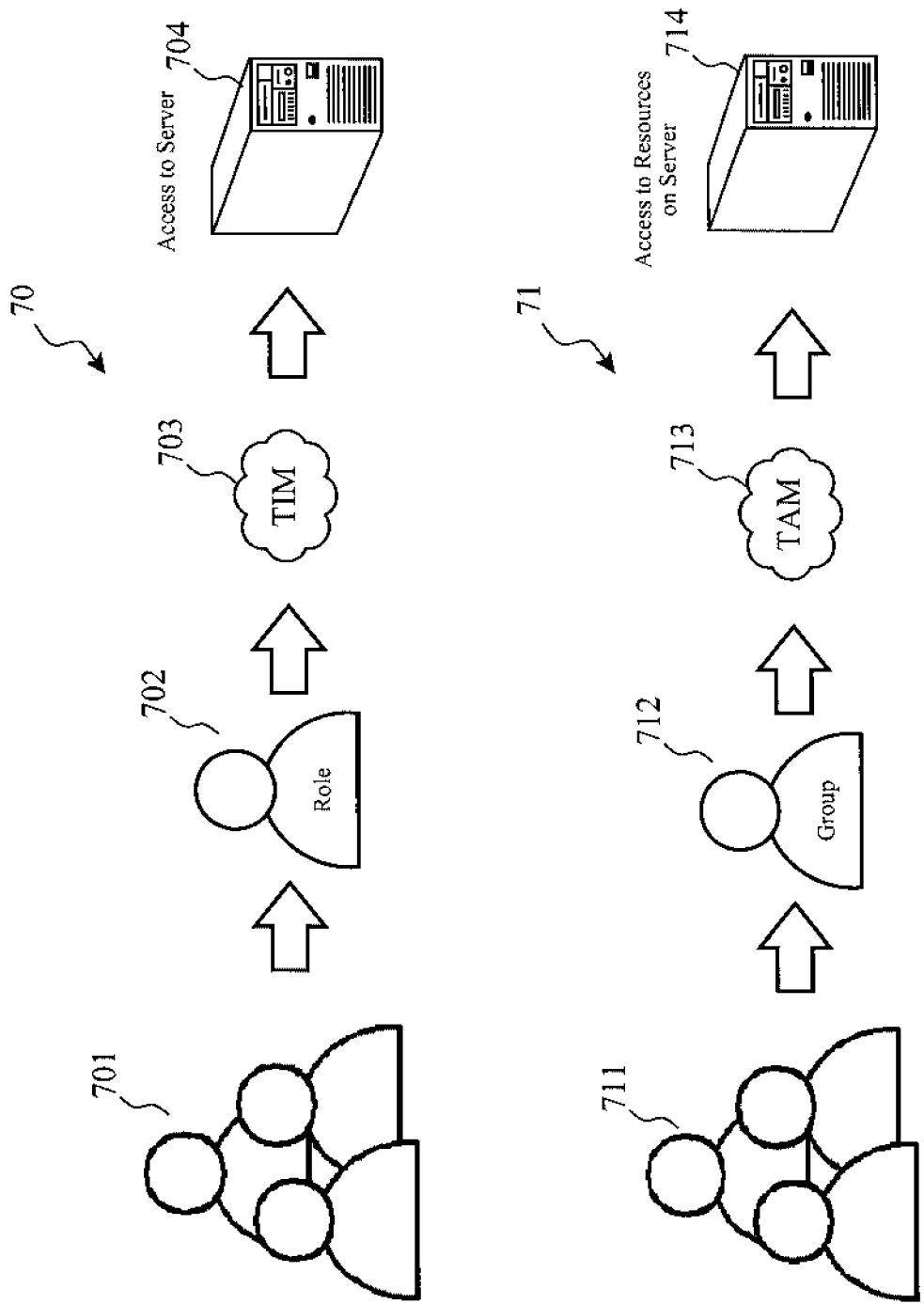
FIG. 7 illustrates the notional similarities but concrete differences between two application programs which relate to the same or similar application objectives (e.g. enterprise security in this example).

For example, as illustrated in FIG. 7, the notions (71) of a TAM (713) "group" object (712) having multiple member users (711) and the notions (70) of a TIM (703) "role" object (702) with multiple users (711) assigned to the role are conceptually equivalent, though differing in their concrete implementation. Similarly, a TAM-controlled "resource" (714) can be mapped to the equivalent combination of a TIM "service" and a TIM "service profile" (704). These examples demonstrate substitution mappings—a common form of mapping—although more complex mappings can also be described.

To build these mappings, a common domain-relevant language (e.g. a security language in this example) is described through rules, which is then used to translate configurations in both directions, from concrete product specific configuration models to abstract configuration models and vice versa.

Figure 8:
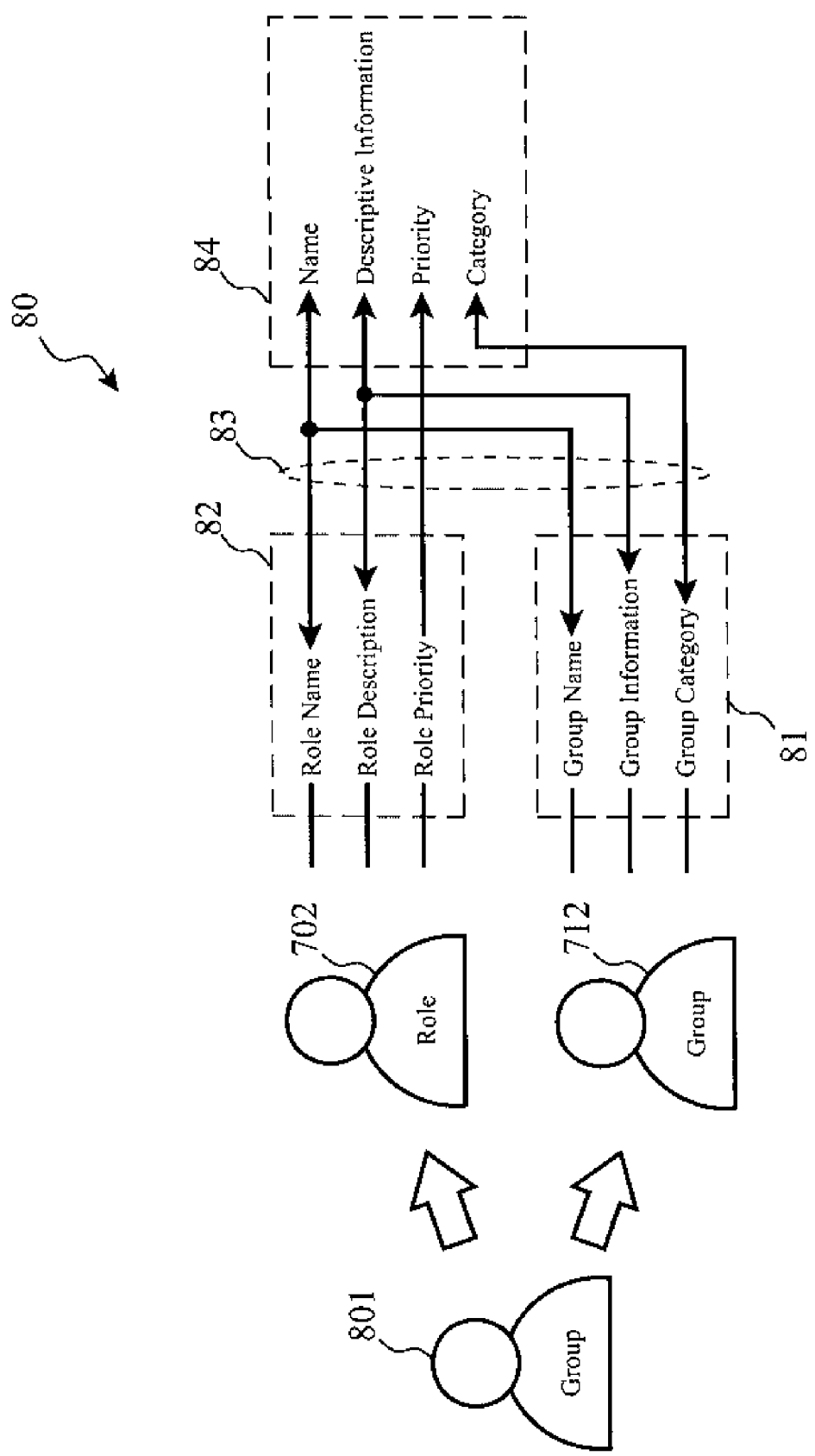
FIG. 8 shows how the invention's mapping rules and equivalency definitions relate the more concrete configuration elements to more abstract configuration elements.

Turning to FIG. 8, an example of the mapping between equivalent configuration elements is shown (80). In this case, TIM and TAM are setup together. There is a chance that the people in the group (801) and roles (712) in the different products have varying access permission. It could be the case that TIM gives the people access to the server (which is correct), but TAM isn't setup properly and disables access to specific resources needed by people on the resource.

To solve this problem, the invention maps (83) the configuration elements which are equivalent between the two concrete configuration models (81, 82) to an abstract configuration model (84). In this case, the invention creates a new conceptually mapped "group" (84) that represents a TIM Role (702) and TAM Group (712) through equivalency. The properties of each are mapped to the analogous properties in the other object (if there are any).

There can be other possible types of mappings, but for this case everything is simplified. In the end, the invention produces a new abstract group object with new, conceptually-defined properties, such as:

New Group Object
Name (mapped)
Descriptive_info (mapped)
Priority
Category

With this information, the invention creates the proper objects in the application-native concrete configuration models of TIM and TAM, which ensures they share the necessary configuration needed to operate together correctly.

Comparison to User Interface Emulation Modes

It should also be noted that some application programs have alternate user interface or control modes through which they emulate user interfaces of competitor products. For example Corel's WordPerfect™ wordprocessor application provides an option in which the user interface can emulate the user interface of Microsoft's™ Word wordprocessor. There are significant differences between the provisions of the present invention and these user-interface emulation modes. For user-interface emulation modes:
- (a) the application programs must be developed or designed to provide the alternate user interface mode, and cannot be retrofitted to emulate other user interfaces after deployment;
- (b) all of the application program's user interface models, whether the native user interface or the emulated user interface, are application-specific models and none of them are abstract in nature;
- (c) such applications which provide alternate concrete configuration emulation modes do not actually configure the competitive application program which it is emulating, so any functionality in the other application program which is not provided by the application program running the emulated mode is not available and unimplemented in the emulated mode.

By contrast, the present invention provides:
- (a) the application programs can be configured by the invention through the abstract model to match that of a competitive product without the need for either application program to have been developed to emulate the configuration model of the other application program;
- (b) the user of the invention does not have to have domain expertise in one or both of the application's specific configuration model(s) as he or she may optionally use the abstract concrete model exclusively; and
- (c) the invention actually configures competitive application programs, which may be run simultaneously to each other or as replacements to each other, thereby combining or replacing functionality such that the totality of the functionality of the end-to-end solution is the sum of the functionality of the individual application programs.

Logical Processes

FIG. 1 illustrates a generalized logical process (10) according to the invention. In one embodiment, the process is fully reversible or "bi-directional". In alternate embodiments, some or all portions of the process may be unidirectional. The following paragraphs describe a reversible process, which is a superset of one or more unidirectional implementations.

A user console (101) may be used to create an abstract configuration (100), or an existing abstract configuration (previously designed) (100) may be accessed (102) by the process (10). Through mapping rules and equivalency definitions (105) such as those previously discussed, one or more concrete configurations (111, 110 respectively) are created (106, 108) by the system, thereby configuring one or more application programs or exporting one or more relatively more concrete abstract models to the next lower layer in the hierarchy. This flow of operation is highly useful for "top-down" methodologies of designing end-to-end solutions.

In another flow of the same logic, one or more existing concrete configurations (111, 110) are received (107, 109, respectively) by the mapping rules and equivalency definitions (105), and a corresponding unified abstract configuration (100) is created (104) to represent the combined configurations and functionality of all of the concrete (or relatively more concrete) models at layers below it. This flow of the logical process provides a high-level, conceptualized view of the totality of the functionality of the system without need for the reviewer to have domain expertise for any of the underlying, incorporated application programs. It also provides an excellent tool for determining configurations of replacement end-to-end solutions for existing solutions which integrate multiple application programs.

In yet another flow of logic, a first concrete configuration (111) is received (107) and mapped (105) to a second concrete configuration (110) through an intermediate stage of creating an abstract configuration (100), which allows for the functionality of the first application program to be replicated or replaced by the functionality of an alternate application program.

In still another flow of logic, a first concrete configuration (111) is received (107) and mapped (105) to one or more additional concrete configurations through an intermediate stage of creating an abstract configuration (100) which allows for the functionality of the first application program to be replicated or replaced by the functionality of a plurality of alternate application programs.

Suitable Computing Platform

In one embodiment of the invention, the functionality of the safeguard tracking system, including the previously described logical processes, are performed in part or wholly by software executed by a computer, such as personal computers, web servers, web browsers, or even an appropriately capable portable computing platform, such as personal digital assistant ("PDA"), web-enabled wireless telephone, or other type of personal information management ("PIM") device.

Therefore, it is useful to review a generalized architecture of a computing platform which may span the range of implementation, from a high-end web or enterprise server platform, to a personal computer, to a portable PDA or web-enabled wireless phone.

Figure 2A:
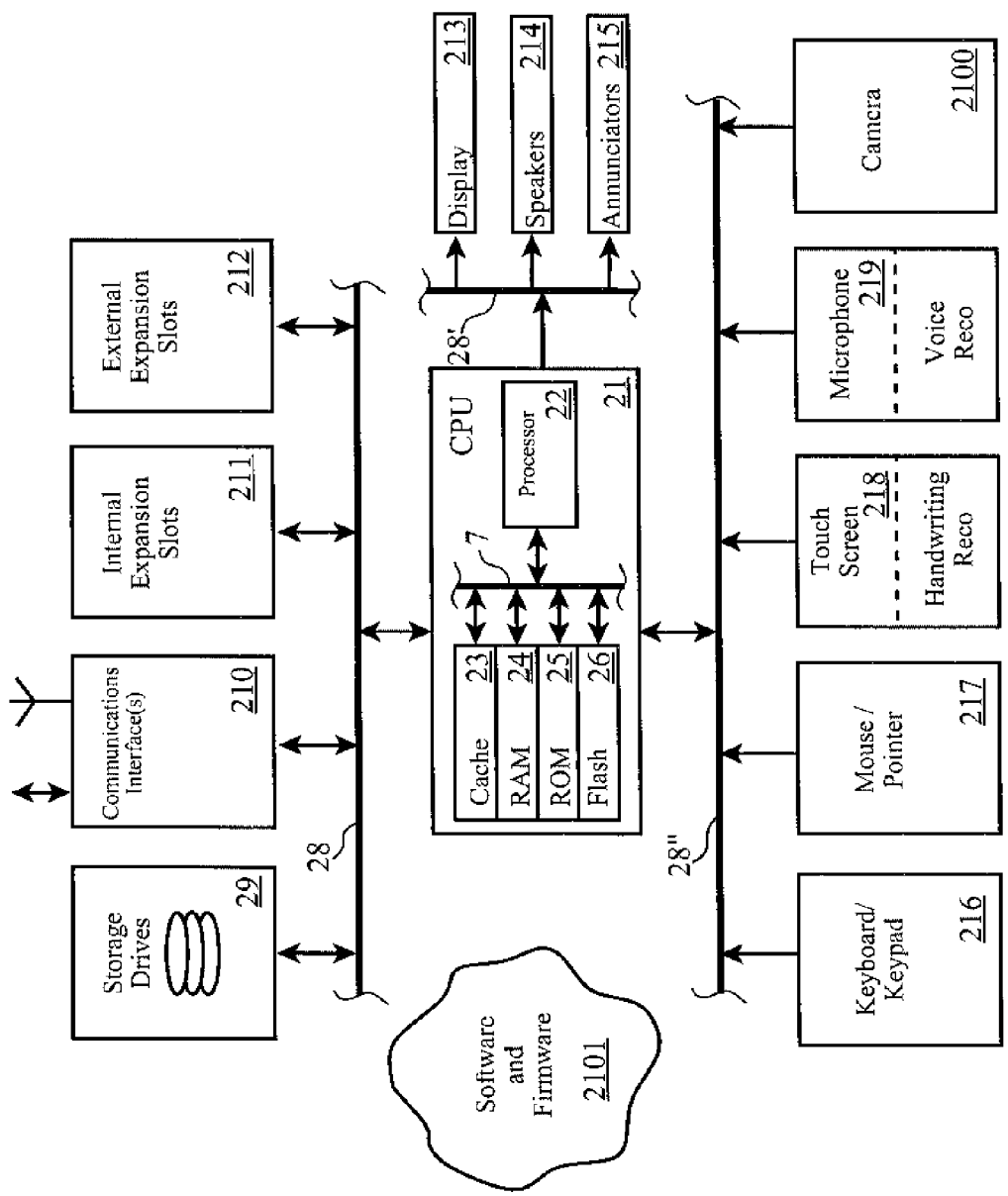
FIGS. 2a and 2b show a generalized computing platform architecture, and a generalized organization of software and firmware of such a computing platform architecture.

Turning to FIG. 2a, a generalized architecture is presented including a central processing unit (21) ("CPU"), which is typically comprised of a microprocessor (22) associated with random access memory ("RAM") (24) and read-only memory ("ROM") (25). Often, the CPU (21) is also provided with cache memory (23) and programmable FlashROM (26). The interface (27) between the microprocessor (22) and the various types of CPU memory is often referred to as a "local bus", but also may be a more generic or industry standard bus.

Many computing platforms are also provided with one or more storage drives (29), such as hard-disk drives ("HDD"), floppy disk drives, compact disc drives (CD, CD-R, CD-RW, DVD, DVD-R, etc.), and proprietary disk and tape drives (e.g., Iomega Zip™ and Jaz™, Addonics SuperDisk™, etc.). Additionally, some storage drives may be accessible over a computer network.

Many computing platforms are provided with one or more communication interfaces (210), according to the function intended of the computing platform. For example, a personal computer is often provided with a high speed serial port (RS-232, RS-422, etc.), an enhanced parallel port ("EPP"), and one or more universal serial bus ("USB") ports. The computing platform may also be provided with a local area network ("LAN") interface, such as an Ethernet card, and other high-speed interfaces such as the High Performance Serial Bus IEEE-1394.

Computing platforms such as wireless telephones and wireless networked PDA's may also be provided with a radio frequency ("RF") interface with antenna, as well. In some cases, the computing platform may be provided with an infra-red data arrangement ("IrDA") interface, too.

Computing platforms are often equipped with one or more internal expansion slots (211), such as Industry Standard Architecture ("ISA"), Enhanced Industry Standard Architecture ("EISA"), Peripheral Component Interconnect ("PCI"), or proprietary interface slots for the addition of other hardware, such as sound cards, memory boards, and graphics accelerators.

Additionally, many units, such as laptop computers and PDA's, are provided with one or more external expansion slots (212) allowing the user the ability to easily install and remove hardware expansion devices, such as PCMCIA cards, SmartMedia cards, and various proprietary modules such as removable hard drives, CD drives, and floppy drives.

Often, the storage drives (29), communication interfaces (210), internal expansion slots (211) and external expansion slots (212) are interconnected with the CPU (21) via a standard or industry open bus architecture (28), such as ISA, EISA, or PCI. In many cases, the bus (28) may be of a proprietary design.

A computing platform is usually provided with one or more user input devices, such as a keyboard or a keypad (216), and mouse or pointer device (217), and/or a touch-screen display (218). In the case of a personal computer, a full size keyboard is often provided along with a mouse or pointer device, such as a track ball or TrackPoint™. In the case of a web-enabled wireless telephone, a simple keypad may be provided with one or more function-specific keys. In the case of a PDA, a touch-screen (218) is usually provided, often with handwriting recognition capabilities.

Additionally, a microphone (219), such as the microphone of a web-enabled wireless telephone or the microphone of a personal computer, is supplied with the computing platform. This microphone may be used for simply reporting audio and voice signals, and it may also be used for entering user choices, such as voice navigation of web sites or auto-dialing telephone numbers, using voice recognition capabilities.

Many computing platforms are also equipped with a camera device (2100), such as a still digital camera or full motion video digital camera.

One or more user output devices, such as a display (213), are also provided with most computing platforms. The display (213) may take many forms, including a Cathode Ray Tube ("CRT"), a Thin Flat Transistor ("TFT") array, or a simple set of light emitting diodes ("LED") or liquid crystal display ("LCD") indicators.

One or more speakers (214) and/or annunciators (215) are often associated with computing platforms, too. The speakers (214) may be used to reproduce audio and music, such as the speaker of a wireless telephone or the speakers of a personal computer. Annunciators (215) may take the form of simple beep emitters or buzzers, commonly found on certain devices such as PDAs and PIMs.

These user input and output devices may be directly interconnected (28', 28") to the CPU (21) via a proprietary bus structure and/or interfaces, or they may be interconnected through one or more industry open buses such as ISA, EISA, PCI, etc.

The computing platform is also provided with one or more software and firmware (2101) programs to implement the desired functionality of the computing platforms.

Figure 2B:
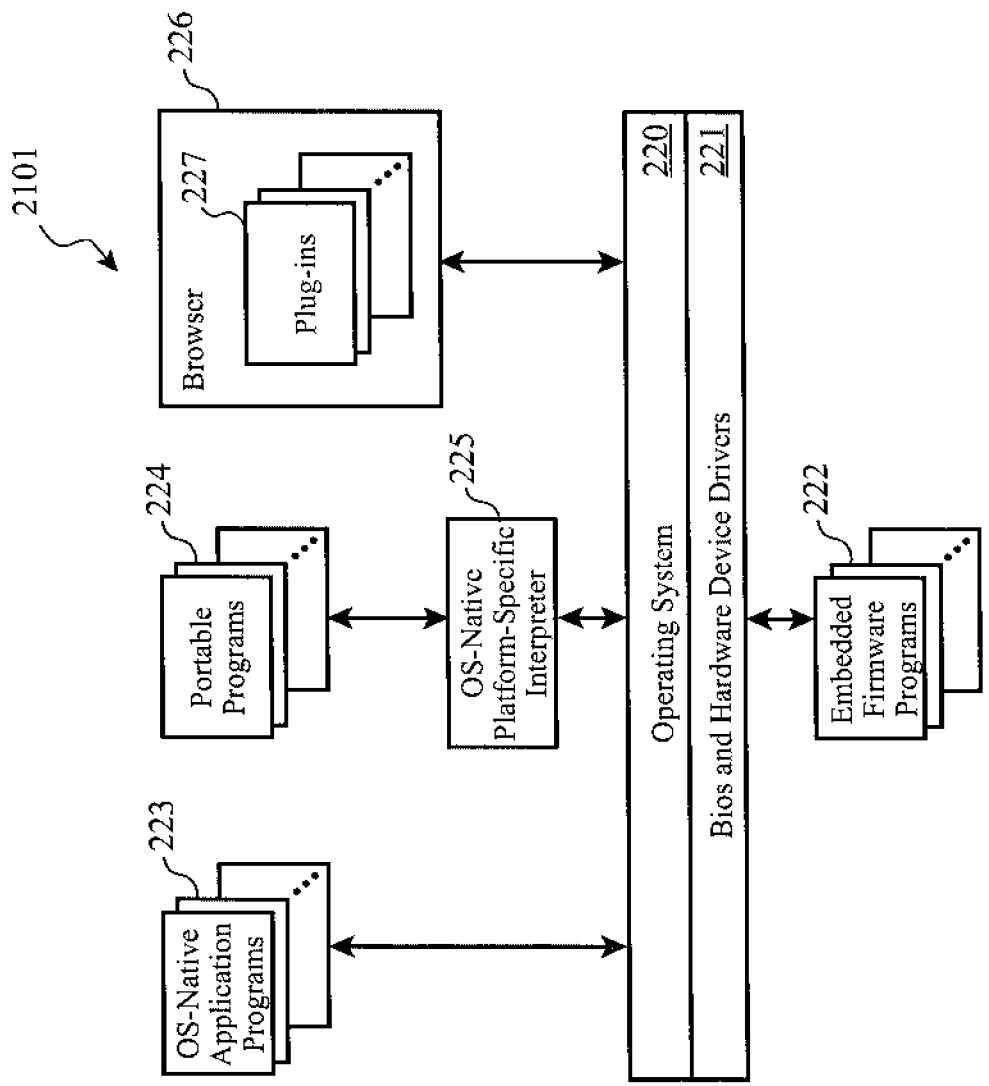

Turning to now FIG. 2b, more detail is given of a generalized organization of software and firmware (2101) on this range of computing platforms. One or more operating system ("OS") native application programs (223) may be provided on the computing platform, such as word processors, spreadsheets, contact management utilities, address book, calendar, email client, presentation, financial and bookkeeping programs.

Additionally, one or more "portable" or device-independent programs (224) may be provided, which must be interpreted by an OS-native platform-specific interpreter (225), such as Java™ scripts and programs.

Often, computing platforms are also provided with a form of web browser or micro-browser (226), which may also include one or more extensions to the browser such as browser plug-ins (227).

The computing device is often provided with an operating system (220), such as Microsoft Windows™, UNIX, IBM OS/2 ™, IBM AIX™, open source LINUX, Apple's MAC OS™, or other platform specific operating systems. Smaller devices such as PDA's and wireless telephones may be equipped with other forms of operating systems such as real-time operating systems ("RTOS") or Palm Computing's PalmOS™.

A set of basic input and output functions ("BIOS") and hardware device drivers (221) are often provided to allow the operating system (220) and programs to interface to and control the specific hardware functions provided with the computing platform.

Additionally, one or more embedded firmware programs (222) are commonly provided with many computing platforms, which are executed by onboard or "embedded" microprocessors as part of the peripheral device, such as a micro controller or a hard drive, a communication processor, network interface card, or sound or graphics card.

As such, FIGS. 2a and 2b describe in a general sense the various hardware components, software and firmware programs of a wide variety of computing platforms, including but not limited to personal computers, PDAs, PIMs, web-enabled telephones, and other appliances such as WebTV™ units. As such, we now turn our attention to disclosure of the present invention relative to the processes and methods preferably implemented as software and firmware on such a computing platform. It will be readily recognized by those skilled in the art that the following methods and processes may be alternatively realized as hardware functions, in part or in whole, without departing from the spirit and scope of the invention.

Service-Based Embodiments

Alternative embodiments of the present invention include some or all of the foregoing logical processes and functions of the multi-layer configuration model invention being provided by configuring software, deploying software, downloading software, distributing software, or remotely serving clients in an on demand environment.

Software Deployment Embodiment. According to one embodiment of the invention, the methods and processes of the invention are distributed or deployed as a service by a service provider to a client's computing system(s). This enables a user to receive the benefits of the configuration model invention via a channel of having the software installed remotely, for example, over a network. Such an embodiment also may lend itself to remote configuration of application programs, such as an administrator being able to remotely configure a wide variety of application programs through an abstract configuration interface as described in the foregoing paragraphs. In this manner, one practical use of the invention would be by remote customer support personnel to provide assistance to a wider variety of application program products.

Figure 3A:
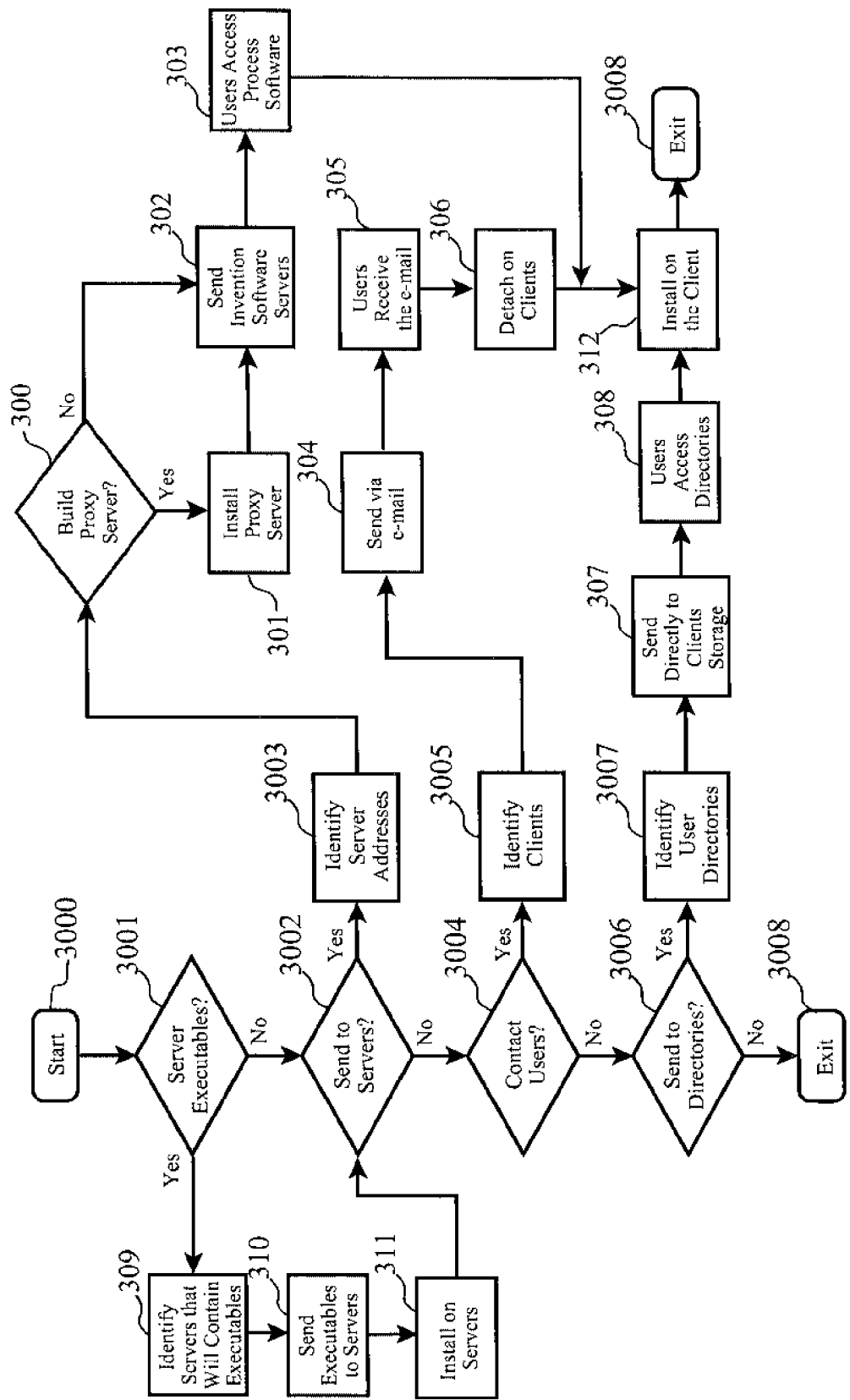
FIG. 3a sets forth a logical process to deploy software to a client in which the deployed software embodies the methods and processes of the present invention.

Turning to FIG. 3a, the deployment process begins (3000) by determining (3001) if there are any programs that will reside on a server or servers when the process software is executed. If this is the case, then the servers that will contain the executables are identified (309). The process software for the server or servers is transferred directly to the servers storage via FTP or some other protocol or by copying through the use of a shared files system (310). The process software is then installed on the servers (311).

Next a determination is made on whether the process software is to be deployed by having users access the process software on a server or servers (3002). If the users are to access the process software on servers, then the server addresses that will store the process software are identified (3003).

In step (3004) a determination is made whether the process software is to be developed by sending the process software to users via e-mail. The set of users where the process software will be deployed are identified together with the addresses of the user client computers (3005). The process software is sent via e-mail to each of the user's client computers. The users then receive the e-mail (305) and then detach the process software from the e-mail to a directory on their client computers (306). The user executes the program that installs the process software on his client computer (312) then exits the process (3008).

A determination is made if a proxy server is to be built (300) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required then the proxy server is installed (301). The process software is sent to the servers either via a protocol such as FTP or it is copied directly from the source files to the server files via file sharing (302). Another embodiment would be to send a transaction to the servers that contained the process software and have the server process the transaction, then receive and copy the process software to the server's file system. Once the process software is stored at the servers, the users via their client computers, then access the process software on the servers and copy to their client computers file systems (303). Another embodiment is to have the servers automatically copy the process software to each client and then run the installation program for the process software at each client computer. The user executes the program that installs the process software on his client computer (312) then exits the process (3008).

Lastly, a determination is made on whether the process software will be sent directly to user directories on their client computers (3006). If so, the user directories are identified (3007). The process software is transferred directly to the user's client computer directory (307). This can be done in several ways such as, but not limited to, sharing of the file system directories and then copying from the sender's file system to the recipient user's file system or alternatively using a transfer protocol such as File Transfer Protocol ("FTP"). The users access the directories on their client file systems in preparation for installing the process software (308). The user executes the program that installs the process software on his client computer (312) then exits the process (3008).

Software Integration Embodiment. According to another embodiment of the present invention, software embodying the methods and processes disclosed herein are integrated as a service by a service provider to other software applications, applets, or computing systems. For example, in this type of embodiment, the logical functions to configure multiple application programs through an abstract, application-nonspecific model may be incorporated into another program, such as a remote help or system diagnostic tool. In a more horizontal type of integration, the logical processes of the present invention may be incorporated into one product of a certain type, such as TIM or TAM, to enable it to configure itself as well as similar or competitive products through an abstract model.

Integration of the invention generally includes providing for the process software to coexist with applications, operating systems and network operating systems software and then installing the process software on the clients and servers in the environment where the process software will function.

Generally speaking, the first task is to identify any software on the clients and servers including the network operating system where the process software will be deployed that are required by the process software or that work in conjunction with the process software. This includes the network operating system that is software that enhances a basic operating system by adding networking features. Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists matches the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

Figure 3B:
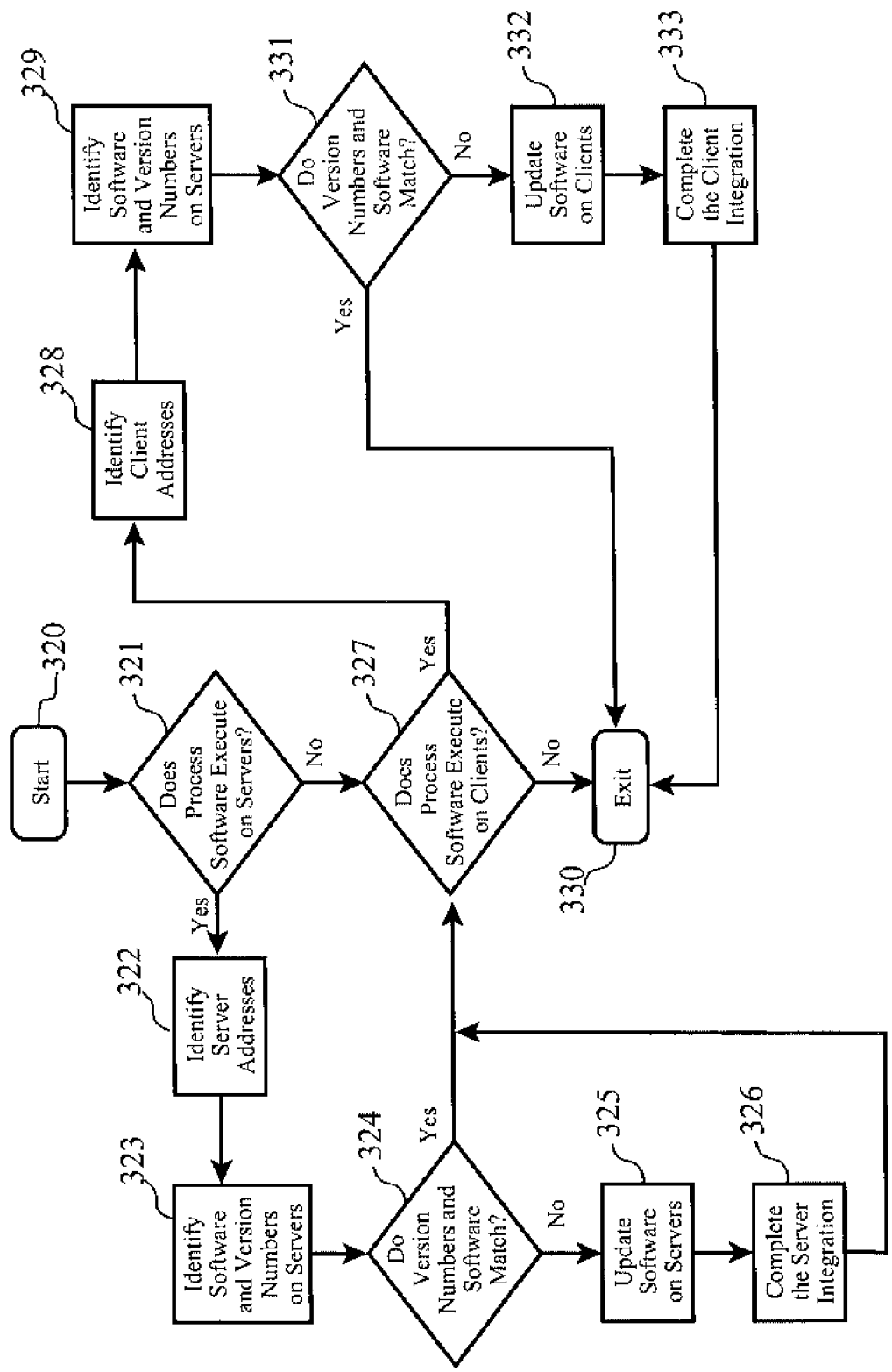
FIG. 3b sets for a logical process to integrate software to other software programs in which the integrated software embodies the methods and processes of the present invention.

Turning to FIG. 3b, details of the integration process according to the invention are shown. Integrating begins (320) by determining if there are any process software programs that will execute on a server or servers (321). If this is not the case, then integration proceeds to (327). If this is the case, then the server addresses are identified (322). The servers are checked to see if they contain software that includes the operating system ("OS"), applications, and network operating systems ("NOS"), together with their version numbers, that have been tested with the process software (323). The servers are also checked to determine if there is any missing software that is required by the process software (323).

A determination is made if the version numbers match the version numbers of OS, applications and NOS that have been tested with the process software (324). If all of the versions match, then processing continues (327). Otherwise, if one or more of the version numbers do not match, then the unmatched versions are updated on the server or servers with the correct versions (325). Additionally, if there is missing required software, then it is updated on the server or servers (325). The server integration is completed by installing the process software (326).

Step (327) which follows either (321), (324), or (326) determines if there are any programs of the process software that will execute on the clients. If no process software programs execute on the clients, the integration proceeds to (330) and exits. If this is not the case, then the client addresses are identified (328).

The clients are checked to see if they contain software that includes the operating system ("OS"), applications, and network operating systems ("NOS"), together with their version numbers, that have been tested with the process software (329). The clients are also checked to determine if there is any missing software that is required by the process software (329).

A determination is made if the version numbers match the version numbers of OS, applications and NOS that have been tested with the process software 331. If all of the versions match and there is no missing required software, then the integration proceeds to (330) and exits.

If one or more of the version numbers do not match, then the unmatched versions are updated on the clients with the correct versions (332). In addition, if there is missing required software then it is updated on the clients (332). The client integration is completed by installing the process software on the clients (333). The integration proceeds to (330) and exits.

Application Programming Interface Embodiment. In another embodiment, the invention may be realized as a service or functionality available to other systems and devices via an Application Programming Interface ("API"). One such embodiment is to provide the service to a client system from a server system as a web service.

On-Demand Computing Services Embodiment. According to another aspect of the present invention, the processes and methods disclosed herein are provided through an on demand computing architecture to render service to a client by a service provider. In these types of embodiments, the logical processes of the multi-layer abstract model configuration invention would be made available to a user on an as-needed basis, typically with the software of the invention executing on a remote server which is accessed when needed by a user via a web browser or client system.

Figure 3C:
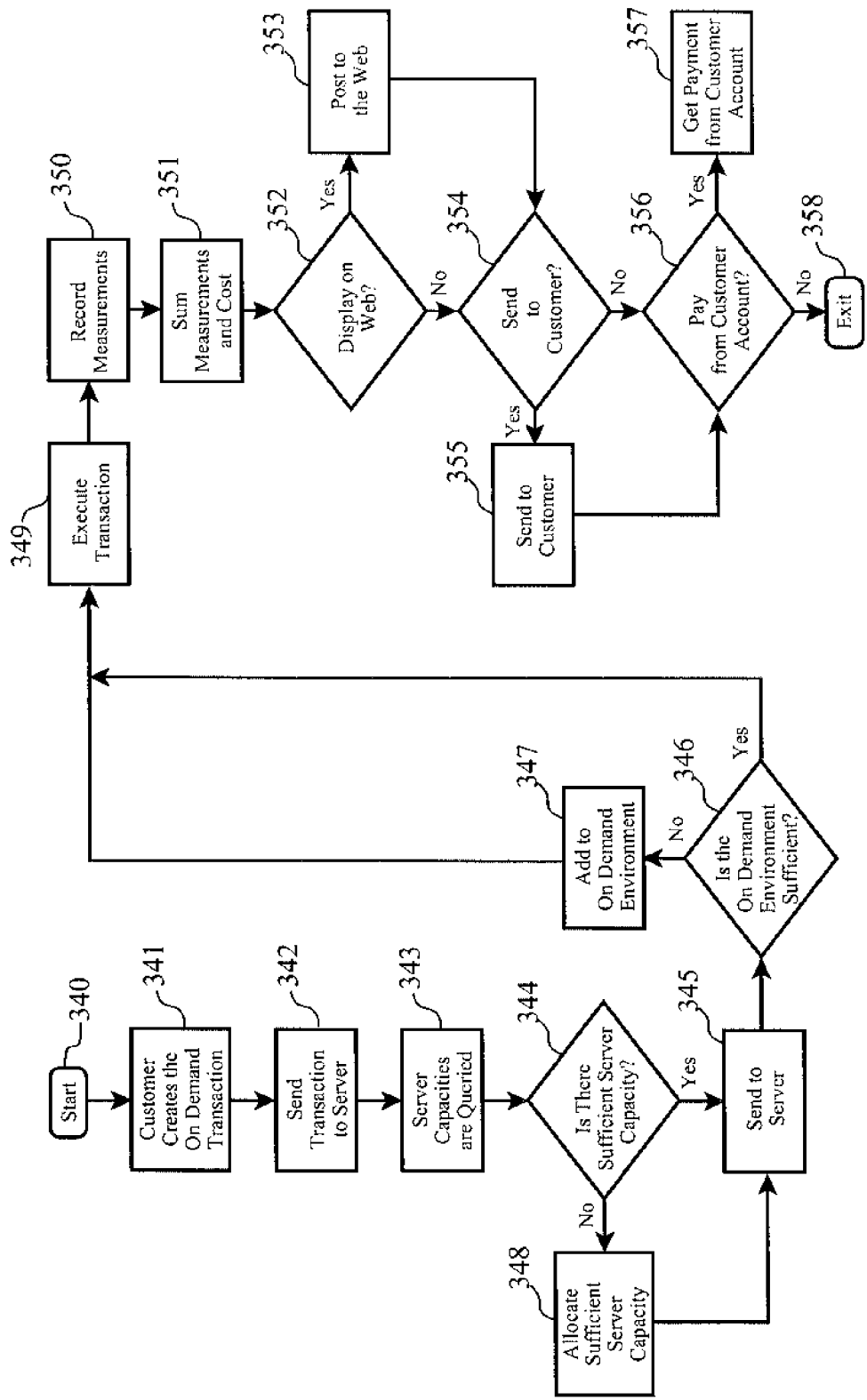
FIG. 3c sets for a logical process to execute software on behalf of a client in an on-demand computing system, in which the executed software embodies the methods and processes of the present invention.

Turning to FIG. 3c, generally speaking, the process software embodying the methods disclosed herein is shared, simultaneously serving multiple customers in a flexible, automated fashion. It is standardized, requiring little customization and it is scaleable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally, the assessed server may make requests of other servers that require CPU units. CPU units are an example that represents but one measurement of use. Other measurements of use include but are not limited to network bandwidth, memory usage, storage usage, packet transfers, complete transactions, etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to effect the performance of that server, other servers are accessed to increase the capacity and to share the workload. Likewise, when other measurements of use such as network bandwidth, memory usage, storage usage, etc. approach a capacity so as to effect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the computer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

FIG. 3c sets forth a detailed logical process which makes the present invention available to a client through an On-Demand process. A transaction is created that contains the unique customer identification, the requested service type and any service parameters that further specify the type of service (341). The transaction is then sent to the main server (342). In an On-Demand environment the main server can initially be the only server, then as capacity is consumed other servers are added to the On-Demand environment.

The server central processing unit ("CPU") capacities in the On-Demand environment are queried (343). The CPU requirement of the transaction is estimated, then the servers available CPU capacity in the On-Demand environment are compared to the transaction CPU requirement to see if there is sufficient CPU available capacity in any server to process the transaction (344). If there is not sufficient server CPU available capacity, then additional server CPU capacity is allocated to process the transaction (348). If there was already sufficient available CPU capacity, then the transaction is sent to a selected server (345).

Before executing the transaction, a check is made of the remaining On-Demand environment to determine if the environment has sufficient available capacity for processing the transaction. This environment capacity consists of such things as, but not limited to, network bandwidth, processor memory, storage etc. (345). If there is not sufficient available capacity, then capacity will be added to the On-Demand environment (347). Next, the required software to process the transaction is accessed, loaded into memory, then the transaction is executed (349).

The usage measurements are recorded (350). The usage measurements consists of the portions of those functions in the On-Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer (351).

If the customer has requested that the On-Demand costs be posted to a web site (352), then they are posted (353). If the customer has requested that the On-Demand costs be sent via e-mail to a customer address (354), then they are sent (355). If the customer has requested that the On-Demand costs be paid directly from a customer account (356), then payment is received directly from the customer account (357). The last step is to exit the On-Demand process.

Computer-Readable Media Embodiments

In another embodiment of the invention, logical processes according to the invention and described herein are encoded on or in one or more computer-readable media. Some computer-readable media are read-only (e.g. they must be initially programmed using a different device than that which is ultimately used to read the data from the media), some are write-only (e.g. from the data encoders perspective they can only be encoded, but not read simultaneously), or read-write. Still some other media are write-once, read-many-times.

Some media are relatively fixed in their mounting mechanisms, while others are removable, or even transmittable. All computer-readable media form two types of systems when encoded with data and/or computer software: (a) when removed from a drive or reading mechanism, they are memory devices which generate useful data-driven outputs when stimulated with appropriate electromagnetic, electronic, and/or optical signals; and (b) when installed in a drive or reading device, they form a data repository system accessible by a computer.

Figure 4A:
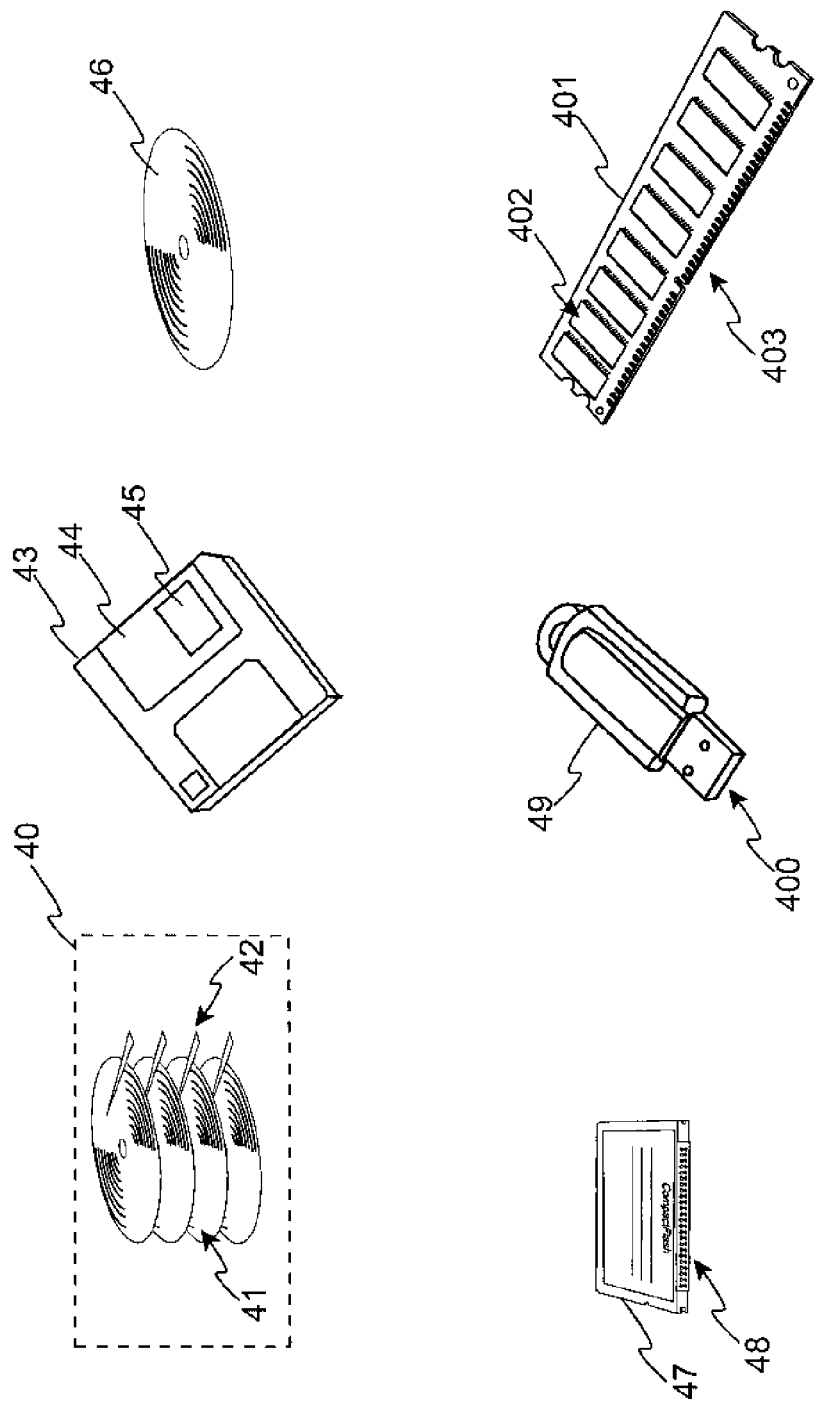
FIG. 4a illustrates computer readable media of various removable and fixed types.

FIG. 4a illustrates some computer readable media including a computer hard drive (40) having one or more magnetically encoded platters or disks (41), which may be read, written, or both, by one or more heads (42). Such hard drives are typically semi-permanently mounted into a complete drive unit, which may then be integrated into a configurable computer system such as a Personal Computer, Server Computer, or the like.

Similarly, another form of computer readable media is a flexible, removable "floppy disk" (43), which is inserted into a drive which houses an access head. The floppy disk typically includes a flexible, magnetically encodable disk which is accessible by the drive head through a window (45) in a sliding cover (44).

A Compact Disk ("CD") (46) is usually a plastic disk which is encoded using an optical and/or magneto-optical process, and then is read using generally an optical process. Some CD's are read-only ("CD-ROM"), and are mass produced prior to distribution and use by reading-types of drives. Other CD's are writable (e.g. "CD-RW", "CD-R"), either once or many time. Digital Versatile Disks ("DVD") are advanced versions of CD's which often include double-sided encoding of data, and even multiple layer encoding of data. Like a floppy disk, a CD or DVD is a removable media.

Another common type of removable media are several types of removable circuit-based (e.g. solid state) memory devices, such as Compact Flash ("CF") (47), Secure Data ("SD"), Sony's MemoryStick, Universal Serial Bus ("USB") FlashDrives and "Thumbdrives" (49), and others. These devices are typically plastic housings which incorporate a digital memory chip, such as a battery-backed random access chip ("RAM"), or a Flash Read-Only Memory ("FlashROM"). Available to the external portion of the media is one or more electronic connectors (48, 400) for engaging a connector, such as a CF drive slot or a USB slot. Devices such as a USB FlashDrive are accessed using a serial data methodology, where other devices such as the CF are accessed using a parallel methodology. These devices often offer faster access times than disk-based media, as well as increased reliability and decreased susceptibility to mechanical shock and vibration. Often, they provide less storage capability than comparably priced disk-based media.

Yet another type of computer readable media device is a memory module (403), often referred to as a SIMM or DIMM. Similar to the CF, SD, and FlashDrives, these modules incorporate one or more memory devices (402), such as Dynamic RAM ("DRAM"), mounted on a circuit board (401) having one or more electronic connectors for engaging and interfacing to another circuit, such as a Personal Computer motherboard. These types of memory modules are not usually encased in an outer housing, as they are intended for installation by trained technicians, and are generally protected by a larger outer housing such as a Personal Computer chassis.

Figure 4B:
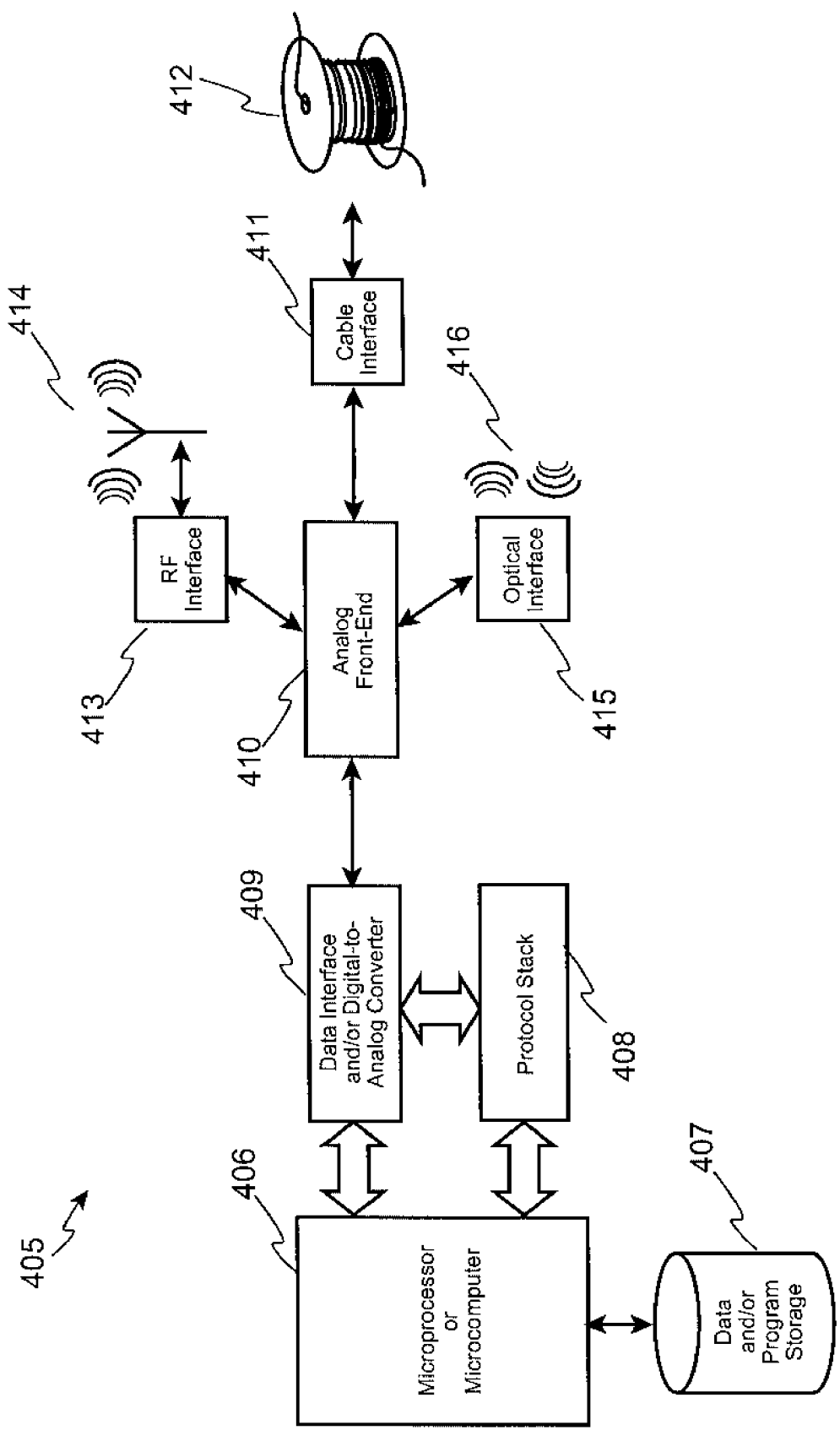
FIGS. 4b and 4c illustrate computer readable media comprising various signal types, signal transceivers, and parallel-to-serial-to-parallel signal circuits.

Turning now to FIG. 4b, another embodiment option (405) of the present invention is shown in which a computer-readable signal is encoded with software, data, or both, which implement logical processes according to the invention. FIG. 4b is generalized to represent the functionality of wireless, wired, electro-optical, and optical signaling systems. For example, the system shown in FIG. 4b can be realized in a manner suitable for wireless transmission over Radio Frequencies ("RF"), as well as over optical signals, such as InfraRed Data Arrangement ("IrDA"). The system of FIG. 4b may also be realized in another manner to serve as a data transmitter, data receiver, or data transceiver for a USB system, such as a drive to read the aforementioned USB FlashDrive, or to access the serially-stored data on a disk, such as a CD or hard drive platter.

In general, a microprocessor or microcontroller (406) reads, writes, or both, data to/from storage for data, program, or both (407). A data interface (409), optionally including a digital-to-analog converter, cooperates with an optional protocol stack (408), to send, receive, or transceive data between the system front-end (410) and the microprocessor (406). The protocol stack is adapted to the signal type being sent, received, or transceived. For example, in a Local Area Network ("LAN") embodiment, the protocol stack may implement Transmission Control Protocol/Internet Protocol ("TCP/IP"). In a computer-to-computer or computer-to-periperal embodiment, the protocol stack may implement all or portions of USB, "FireWire", RS-232, Point-to-Point Protocol ("PPP"), etc.

The system's front-end, or analog front-end, is adapted to the signal type being modulated, demodulate, or transcoded. For example, in an RF-based (413) system, the analog front-end comprises various local oscillators, modulators, demodulators, etc., which implement signaling formats such as Frequency Modulation ("FM"), Amplitude Modulation ("AM"), Phase Modulation ("PM"), Pulse Code Modulation ("PCM"), etc. Such an RF-based embodiment typically includes an antenna (414) for transmitting, receiving, or transceiving electromagnetic signals via open air, water, earth, or via RF wave guides and coaxial cable. Some common open air transmission standards are BlueTooth, Global Services for Mobile Communications ("GSM"), Time Division Multiple Access ("TDMA"), Advanced Mobile Phone Service ("AMPS"), and Wireless Fidelity ("Wi-Fi").

In another example embodiment, the analog front-end may be adapted to sending, receiving, or transceiving signals via an optical interface (415), such as laser-based optical interfaces (e.g. Wavelength Division Multiplexed, SONET, etc.), or Infra Red Data Arrangement ("IrDA") interfaces (416). Similarly, the analog front-end may be adapted to sending, receiving, or transceiving signals via cable (412) using a cable interface, which also includes embodiments such as USB, Ethernet, LAN, twisted-pair, coax, Plain-old Telephone Service ("POTS"), etc.

Signals transmitted, received, or transceived, as well as data encoded on disks or in memory devices, may be encoded to protect it from unauthorized decoding and use. Other types of encoding may be employed to allow for error detection, and in some cases, correction, such as by addition of parity bits or Cyclic Redundancy Codes ("CRC"). Still other types of encoding may be employed to allow directing or "routing" of data to the correct destination, such as packet and frame-based protocols.

Figure 4C:
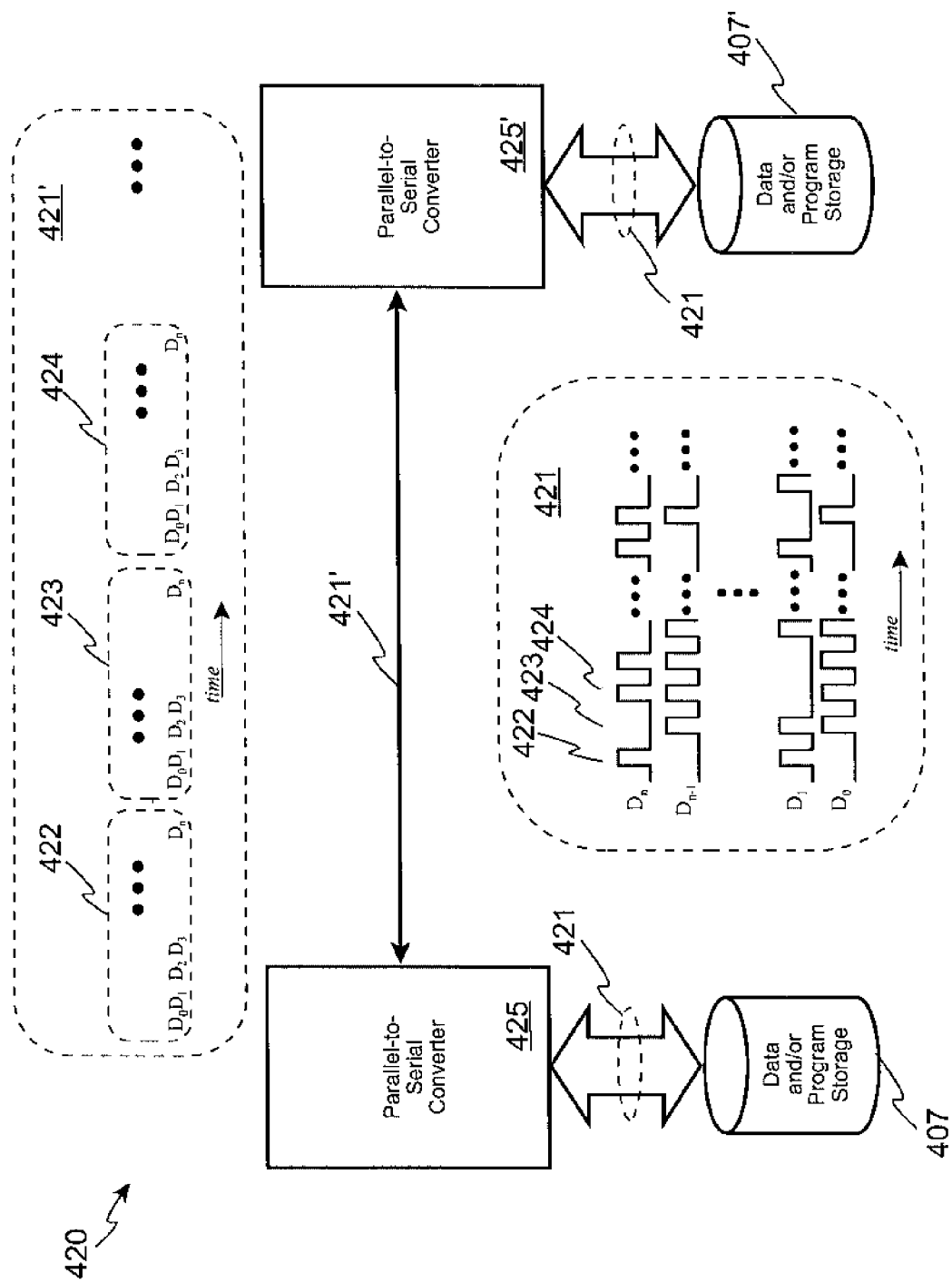

FIG. 4c illustrates conversion systems which convert parallel data to and from serial data. Parallel data is most often directly usable by microprocessors, often formatted in 8-bit wide bytes, 16-bit wide words, 32-bit wide double words, etc. Parallel data can represent executable or interpretable software, or it may represent data values, for use by a computer. Data is often serialized in order to transmit it over a media, such as a RF or optical channel, or to record it onto a media, such as a disk. As such, many computer-readable media systems include circuits, software, or both, to perform data serialization and re-parallelization.

Parallel data (421) can be represented as the flow of data signals aligned in time, such that parallel data unit (byte, word, d-word, etc.) (422, 423, 424) is transmitted with each bit $D_0$-$D_n$ being on a bus or signal carrier simultaneously, where the "width" of the data unit is n−1. In some systems, $D_0$ is used to represent the least significant bit ("LSB"), and in other systems, it represents the most significant bit ("MSB"). Data is serialized (421) by sending one bit at a time, such that each data unit (422, 423, 424) is sent in serial fashion, one after another, typically according to a protocol.

As such, the parallel data stored in computer memory (407, 407') is often accessed by a microprocessor or Parallel-to-Serial Converter (425, 425') via a parallel bus (421), and exchanged (e.g. transmitted, received, or transceived) via a serial bus (421'). Received serial data is converted back into parallel data before storing it in computer memory, usually. The serial bus (421') generalized in FIG. 4c may be a wired bus, such as USB or Firewire, or a wireless communications medium, such as an RF or optical channel, as previously discussed.

In these manners, various embodiments of the invention may be realized by encoding software, data, or both, according to the logical processes of the invention, into one or more computer-readable mediums, thereby yielding a product of manufacture and a system which, when properly read, received, or decoded, yields useful programming instructions, data, or both, including, but not limited to, the computer-readable media types described in the foregoing paragraphs.

CONCLUSION

While certain examples and details of a preferred embodiment have been disclosed, it will be recognized by those skilled in the are that variations in implementation such as use of different programming methodologies, computing platforms, and processing technologies, may be adopted without departing from the spirit and scope of the present invention. Therefore, the scope of the invention should be determined by the following claims.

What is claimed is:

1. A system comprising:
   an element input receiving a first application program configuration element and an associated configuration element value from a first concrete application configuration model, and receiving a second application configuration element from a second concrete application configuration model, wherein the first concrete application configuration model follows user interface terminology, naming conventions, range definitions, and option identifiers compatible with machine implemented language of a first application program, wherein the second concrete application configuration model follows user interface terminology, naming conventions, range definitions, and option identifiers compatible with machine implemented language of a second application programs, wherein the first concrete application configuration model are incompatible with the second concrete application model, wherein the configuration elements and associated element values are used to control configurable functions of the first and second application programs, respectively, and wherein the second configuration element has a similar configuration function as the first configuration element;
   a first equivalence definition in computer storage memory reflecting a functional relationship between the first application program configuration element and an abstract model configuration element having the similar configuration function, wherein the abstract model configuration is application-independent and platform-independent;
   a second equivalence definition in computer storage memory reflecting a functional relationship between the second application program configuration element and the abstract model configuration element; and
   a mapper producing and associating a second configuration element value with the second application configuration element wherein the second application program is automatically configured according to the second concrete application configuration model.

2. The system as set forth in claim 1 further comprising a hierarchy of a plurality of configuration models having configuration elements and element values, a portion of the hierarchy being produced by the mapper such that a lowest level of the hierarchy comprises one or more concrete configuration models specific to one or more application programs, and such that a higher level of the hierarchy comprises an abstraction of configuration models of at least two application programs.

3. The system as set forth in claim 2 wherein the higher level abstract configuration model comprises an abstraction of a group of configuration models according to function or operation of the group.

4. The system as set forth in claim 3 wherein the higher level abstract configuration model comprises a security management group configuration model.

5. The system as set forth in claim 2 wherein the higher level abstract configuration model comprises an abstraction of a group of configuration models according to vendor or supplier of the group.

6. The system as set forth in claim 1 wherein the mapper is configured to produce a second configuration element value which is more abstract relative to the received element value.

7. The system as set forth in claim 1 wherein the mapper is configured to produce a second configuration element value which is more concrete relative to the received element value.

8. The system as set forth in claim 1 wherein the mapper is further configured to produce a third configuration element value from the second configuration element value, wherein the third configuration element value is more abstract relative to the second configuration element value.

9. The system as set forth in claim 1 wherein the mapper is further configured to produce a third configuration element value from the second configuration element value, wherein the third configuration element value is more concrete relative to the second configuration element value.

10. An automated method comprising:
    receiving a first application program configuration element and associated element value from a first concrete application configuration model and receiving a second application configuration element from a second concrete application configuration model, wherein the first concrete application configuration model follows user interface terminology, naming conventions, range definitions, and option identifiers compatible with machine implemented language of a first application program, wherein the second concrete application configuration model follows user interface terminology, naming conventions, range definitions, and option identifiers compatible with machine implemented language of a second application programs, wherein the first concrete application configuration model are incompatible with the second concrete application model, wherein the configuration elements and associated element values are used to control configurable functions of the first and second application programs, respectively, and wherein the second configuration element has a similar configuration function as the first configuration element;

receiving a first equivalence definition in computer storage memory reflecting a functional relationship between the first application program configuration element and an abstract model configuration element having the similar configuration function, wherein the abstract model configuration is application-independent and platform-independent;

receiving a second equivalence definition in computer storage memory reflecting a functional relationship between the second application program configuration element and the abstract model configuration element; and a mapper producing and associating a second configuration element value with the second application configuration element wherein the second application program is automatically configured according to the second concrete application configuration model.

11. The method as set forth in claim 10 further comprising a hierarchy of a plurality of configuration models having configuration elements and element values, a portion of the hierarchy being mapped such that a lowest level of the hierarchy comprises one or more concrete configuration models specific to one or more application programs, and such that a higher level of the hierarchy comprises an abstraction of configuration models of at least two application programs.

12. The method as set forth in claim 11 wherein the higher level abstract configuration model comprises an abstraction of a group of configuration models according to a similarity selected from the group of application function, application operation, application supplier, and application vendor.

13. The method as set forth in claim 12 wherein the higher level abstract configuration model comprises a security management group configuration model.

14. The method as set forth in claim 10 wherein the step of mapping comprises producing a second configuration element value which is more abstract relative to the received element value.

15. The method as set forth in claim 10 wherein the step of mapping comprises producing a second configuration element value which is more concrete relative to the received element value.

16. A computer program product in a computer readable storage memory comprising:
a computer readable storage memory suitable for encoding computer programs; and
one or more computer programs encoded by the computer readable storage memory and configured to cause a processor to:
receive a first application program configuration element and associated element value from a first concrete application configuration model and receive a second application configuration element from a second concrete application configuration model, wherein the first concrete application configuration model follows user interface terminology, naming conventions, range definitions, and option identifiers compatible with machine implemented language of a first application program, wherein the second concrete application configuration model follows user interface terminology, naming conventions, range definitions, and option identifiers compatible with machine implemented language of a second application programs, wherein the first concrete application configuration model are incompatible with the second concrete application model, wherein the configuration elements and associated element values are used to control configurable functions of the first and second application programs, respectively, and wherein the second configuration element has a similar configuration function as the first configuration element;
receive a first equivalence definition in computer storage memory reflecting a functional relationship between the first application program configuration element and an abstract model configuration element having the similar configuration function, wherein the abstract model configuration is application-independent and platform-independent; and
receive a second equivalence definition in computer storage memory reflecting a functional relationship between the second application program configuration element and the abstract model configuration element; and
produce and associate a second configuration element value with the second application configuration element wherein the second application program is automatically configured according to the second concrete application configuration model.

17. The program product as set forth in claim 16 further comprising instructions for producing a portion of a hierarchy configuration models having configuration elements and element values, in which hierarchy a lowest level of the hierarchy comprises one or more concrete configuration models specific to one or more application programs, and in which hierarchy a higher level of the hierarchy comprises an abstraction of configuration models of at least two application programs.

18. The program product as set forth in claim 17 wherein the higher level abstract configuration model comprises an abstraction of a group of configuration models according to a similarity selected from the group of application function, application operation, application supplier, and application vendor.

19. The program product as set forth in claim 18 wherein the higher level abstract configuration model comprises a security management group configuration model.

20. The program product as set forth in claim 16 wherein the mapping instructions further comprise instructions to produce a second configuration element value which is more abstract relative to the received element value.

* * * * *